No. 821,212. PATENTED MAY 22, 1906.
F. M. ASHLEY.
CLUTCH.
APPLICATION FILED JUNE 14, 1899.
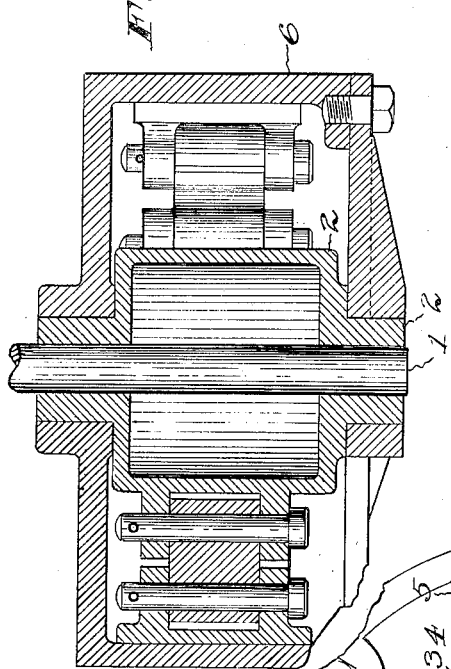
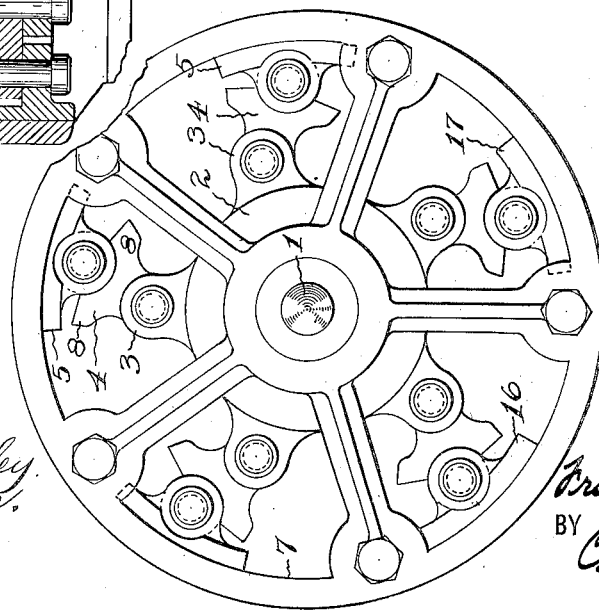
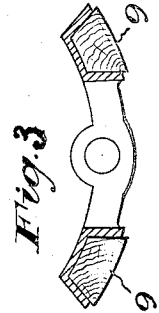
WITNESSES:
Geo. B Rowley
Alex Ferguson
INVENTOR
Frank M. Ashley
BY C.W. Edwards
ATTORNEY

UNITED STATES PATENT OFFICE.

FRANK M. ASHLEY, OF NEW YORK, N. Y.

CLUTCH.

No. 821,212.   Specification of Letters Patent.   Patented May 22, 1906.

Application filed June 14, 1899. Serial No. 720,510.

*To all whom it may concern:*

Be it known that I, FRANK M. ASHLEY, a citizen of the United States, residing at New York, in the county of Kings and State of New York, have invented certain new and useful Improvements in Clutches, of which the following is a full, clear, and exact specification.

This invention consists of a clutch of improved construction adapted to connect an engine or other prime mover with a driven shaft and maintain the connection up to the normal speed of the driven shaft and to disconnect said engine or other prime mover from said shaft when the speed of the engine tends to fall below the normal rate of that of the said shaft.

The improved clutch will be found particularly useful in connection with power transmission, whereby the power generated by an engine or other generator which does not run at a constant speed can transmit the power it generates to the driven shaft or place of consumption at a more uniform rate of speed.

In the accompanying drawings, forming part of this specification, Figure 1 is a side view of a clutch mechanism embodying my invention. Fig. 2 is a sectional view of the clutch shown in Fig. 1, and Fig. 3 is a detail view of a modified form of clutch-shoe.

1 designates the driven shaft, and fixed to this shaft is a hub 2 or other suitable means for supporting the gripping-shoes. Upon the hub 2 are a number of standards 3 3, in which are pivotally mounted links 4 4, the latter carrying at their extremities pivotally-mounted gripping-shoes 5 5 5. A circular rim 6 is mounted upon a bearing of the hub 2, whereby the rim is free to rotate independently of the shaft and hub. The rim 6 is provided with a surface adapted to receive a belt or with other means whereby the rim may be connected with the engine or other generator.

The rim 6 is provided with an inner circumferential gripping-surface 7, against which the shoes 5 5 are adapted to fit. The links 4 are of sufficient length to provide that the shoe shall project slightly forward of the standard 3 in the direction opposite to that in which the hub is to be rotated. For instance, in the structure illustrated in Fig. 1 the links so incline that when the rim is rotated from right to left and at the proper speed the shoes 5 will grip the friction-surface 7 and rotate the hub and shaft. Each link 4 is provided with shoulders 8 8, if preferred, to present means, as illustrated in Fig. 1, for preventing the shoe from falling too far away from the gripping-surface. If desired, each shoe may be equipped with wooden grips 9 9, as illustrated in Fig. 3, to promote the frictionally-engaging capacity of the shoe.

In the operation of the described device the shoes 5 are normally out of engagement with the rim 6, except that one or two of said shoes may rest against the same by reason of their own weight, as would be the case with the shoes 16 and 17 in Fig. 1. When the engine starts up, there will be little friction between these two shoes and the gripping-surface, and therefore the engine is permitted to freely exert its power in getting under way, the effect being that the rim 6 is practically loosely revolved. The hub and shaft, however, acquire a motion which as it is accelerated causes the other shoes to come into engagement with the friction-surface 7 and transmit the full speed of the engine to the hub and shaft. When the speed of the rim under the action of the engine tends to exceed the normal running speed, the engine cut-off will at such period operate to cause the engine under the resistance of its load to slow down, under which conditions the rim 6 will run at a slower rate than the hub and shaft, and hence operate to effect the disconnection of the frictional engagement of the shoes therewith, the hub and shaft continuing to rotate at a normal speed under the action of the momentum acquired. The engine can then be again run at an increasing rate until it equals the rate of revolution of the hub and shaft, whereupon the shoes will further grip the rim and the driving and driven parts operate synchronously. Manifestly the action of the clutch is such that the shaft 1 and machine receiving motion from the same are operated at a constant speed irrespective of variations in the speed of the gas-engine or other power-generator.

The construction of the improved clutch is such that it is exceedingly compact and is quickly sensible of and positively operative under varying conditions between the driving and driven parts.

The gravital movement of the shoes, limited by the shoulders 8 8, permits said shoes to be supported for ready engagement with the rim without the liability of the shoes falling out of position and without the necessity for coactive supporting-springs.

Having now described my invention, what I claim as new, and desire to secure by Letters Patent, is—

1. The combination in a clutch, of a driven shaft having a hub revoluble therewith and provided with a projecting bearing, of a rim revolubly supported on said bearing, links pivotally connected to the hub and carrying shoes normally in juxtaposition to said rim, each link solely supporting its shoe normally to one side of the link connection with the hub and in a direction opposite to that in which the rim is to be driven, whereby the revolution of the rim in one direction will cause the shoes to frictionally engage therewith and drive the hub and its shaft, and subsequently upon a speed of the rim lower than that of the hub and shaft result in a disengagement of said shoes with said rim.

2. The combination in a clutch, of a driven shaft having a hub revoluble therewith and provided with a projecting bearing, of a rim revolubly supported on said bearing, links pivotally connected to the hub and carrying shoes normally in juxtaposition to said rim, each link being of approximately triangular form to present oppositely-extending shoulders, and solely supporting its shoe normally to one side of the link connection with the hub and in a direction opposite to that in which the rim is to be driven, whereby the revolution of the rim in one direction will cause the shoes to frictionally engage therewith and drive the hub and its shaft, and subsequently upon a speed of the rim lower than that of the hub and shaft result in a disengagement of said shoes with said rim.

In testimony whereof I have affixed my signature in presence of two witnesses.

FRANK M. ASHLEY.

Witnesses:
C. V. EDWARDS,
ALEX FERGUSON.